(12) United States Patent
Stumpe et al.

(10) Patent No.: US 6,234,584 B1
(45) Date of Patent: May 22, 2001

(54) METHOD AND APPARATUS FOR CONTROLLING THE BRAKE SYSTEM OF A VEHICLE

(75) Inventors: Werner Stumpe, Stuttgart; Roland Karrelmeyer, Ditzingen; Klaus-Dieter Leimbach, Moeglingen; Matthias Horn, Hardheim; Hans Veil, Eberdingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 08/915,480

(22) Filed: Aug. 20, 1997

(30) Foreign Application Priority Data

Aug. 22, 1996 (DE) .................................. 196 33 834

(51) Int. Cl.[7] ............................................. B60T 13/26
(52) U.S. Cl. .............................. 303/7; 303/15; 303/22.6
(58) Field of Search ..................... 303/3, 7, 15, 113.5, 303/9.62, 22.6, 22.7

(56) References Cited

U.S. PATENT DOCUMENTS

| 4,230,374 | * | 10/1980 | King ................................ 303/22.6 |
| 5,281,006 |   | 1/1994  | Gotz et al. . |
| 5,295,736 | * | 3/1994  | Brearley .............................. 303/7 |
| 5,738,418 | * | 4/1998  | Stumpe et al. ...................... 303/15 |
| 5,803,554 | * | 9/1998  | Murata et al. ....................... 303/7 |

FOREIGN PATENT DOCUMENTS

| 4112845  | 10/1992 | (DE) . |
| 19521872 | 12/1996 | (DE) . |
| 0370678  | 5/1990  | (EP) . |
| 0531077  | 3/1993  | (EP) . |

OTHER PUBLICATIONS

Wrede J. Et al "Brake by Wire for Commercial Vehicles", SAE Transactions Journal of Commercial Vehicles, vol. 101, No. 922489, pp. 849–859.
Brake by Wire for Commercial Vehicles, Jürgen Wrede and Heinz Decker, Robert Bosch GmbH,Jun. 1992.

* cited by examiner

Primary Examiner—Matthew C. Graham
(74) Attorney, Agent, or Firm—Fulbright & Jaworski, LLP

(57) ABSTRACT

A method and an apparatus for controlling the brake system of a vehicle consisting of at least two component vehicles is described, where the brake system of the second component vehicle is controlled from the first component vehicle. The first time the brake pedal is actuated or the first time the brake pedal is released after the braking force has been built up, actuation pulses for the brake system of the second component vehicle are formed, which are derived from the application point of the brakes of the second component vehicle.

9 Claims, 4 Drawing Sheets

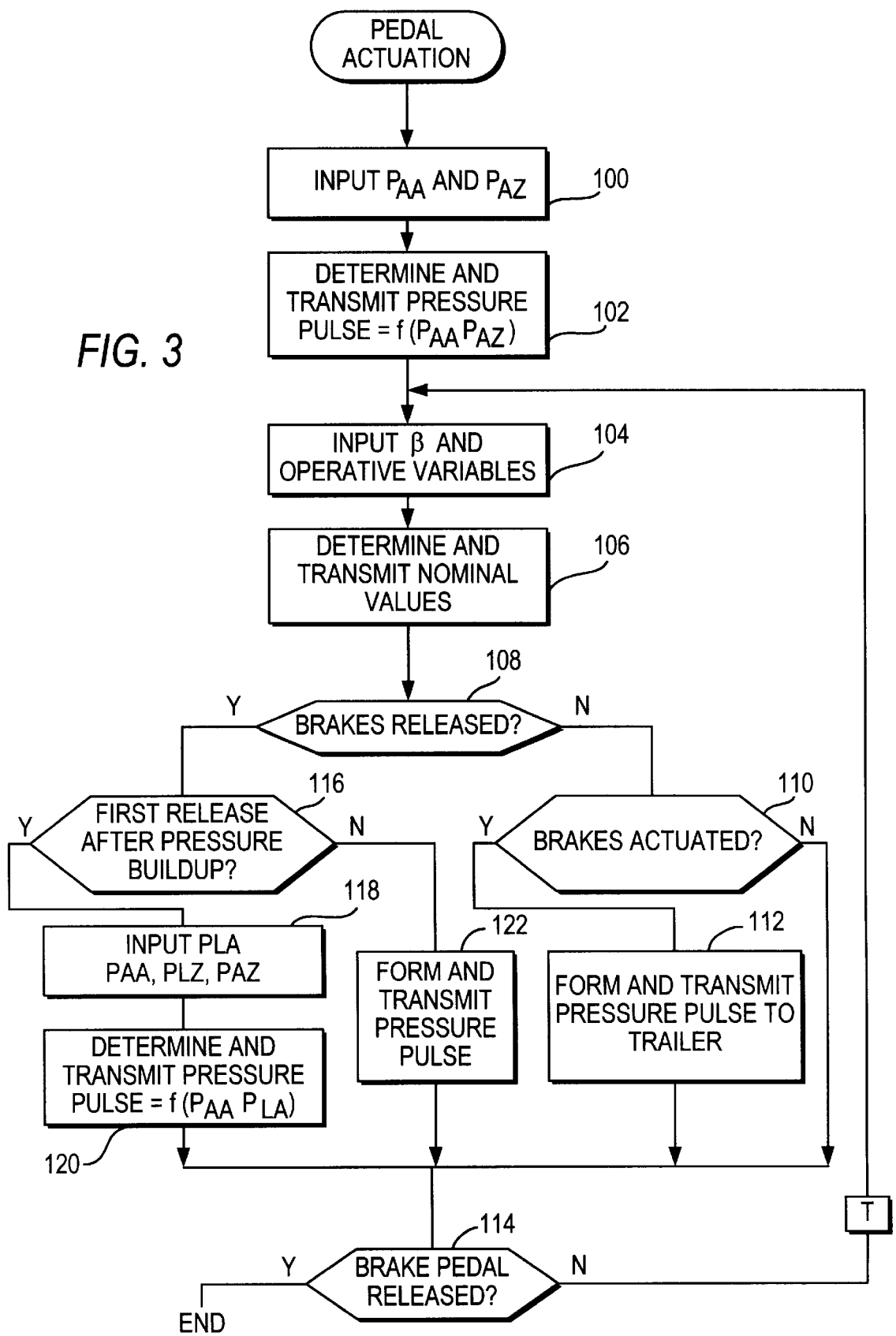

METHOD AND APPARATUS FOR CONTROLLING THE BRAKE SYSTEM OF A VEHICLE

BACKGROUND OF THE INVENTION

1. Field of the Invention

The invention pertains to a method and to an apparatus for controlling the brake system of a vehicle according to introductory clauses of the independent claims.

2. Description of the Prior Art

An automatic, electrically controlled brake system for a vehicle in which, by way of an appropriate interface, the brake system of a trailer or semitrailer can additionally be controlled by means of an open-loop or closed-loop control circuit is known from SAE Paper 92 24 89, "Brake by Wire for Commercial Vehicles". In combination vehicles of this type, the forces which occur between the component vehicles when the train is braked, especially the force in the longitudinal direction, is especially important, because they can have an effect on both driving comfort and driving safety. The goal of the open-loop or closed-loop control of the brake systems of a combination vehicle of this type is to minimize these forces. It has been found that the different brake hystereses of the component vehicles, that is, the fact that the brakes of the component vehicles require different lengths of time for their application and also for their release, make a considerable contribution to the occurrence of these longitudinal forces. Therefore, ways have been sought in the past to determine the points at which the brakes of the component vehicles are applied and/or released.

For example, DE 41 12 845 A1 describes a compressed-air brake system, in which, when the brakes are actuated, the change in pressure over time is evaluated to determine the application point and the associated actuating variable of the individual wheel brakes. In addition, a procedure is known from not previously published German Patent Application No. 195 218 72.8 of Jun. 16, 1995, according to which the application and/or release of the trailer or semitrailer brakes can be determined by an identification procedure during the buildup and reduction of the braking force, in that inflection points in the deceleration curve of the overall vehicle are detected. By means of such measures, the actuating variables to be specified for the application and/or release of the wheel brakes of the component vehicles of a vehicle train can be derived.

Taking these values into consideration in the control of the brake systems makes a significant contribution to the improvement of the braking behavior. In spite of this improvement, however, transient defects in the coordination of the brakes of the component vehicles can occur during the buildup or reduction of the braking force as a result of the dead times which are caused by, for example, the length of the brake lines leading to the trailer's brakes. One of the signs of this situation is, for example, when the trailer bumps into the rear of the tractor; this occurs as a result of a delay in the buildup of the braking forces in the trailer's brakes.

SUMMARY OF THE INVENTION

The task of the invention is to provide measures for avoiding such defects in coordination between the component vehicles during the braking process even during the buildup and/or reduction of the braking force.

By means of the solution according to the invention, transient defects in the coordination between the component vehicles during the buildup and/or reduction of the braking forces are effectively avoided.

It is especially advantageous that the dead times caused by, for example, the length of the brake lines leading to the brakes of the trailer are almost completely compensated. As a result, the impact of the trailer against the rear of the tractor and the dragging effect of the trailer on the tractor when the brakes are released are advantageously avoided.

It is especially advantageous that, even at the beginning of a braking process, and especially during the "empty" distance traveled by the brake pedal, an actuating variable for the braking force, which is derived from the detected brake application value, acts on the trailer brakes. When this braking force corresponds to the application value, the dead times are compensated in optimum fashion. It is also advantageous that the difference between the application pressure of the tractor and that of the trailer is produced or that the application pressure which has been produced is reduced to this value.

It is also an advantage that the hysteresis of the trailer brakes is taken into account the first time there is change from a braking force buildup to a braking force reduction. Thus, by means of a braking force reduction pulse in this operating state, the hysteresis of the trailer brakes can be compensated, or the hysteresis of the brakes of the tractor can be adjusted accordingly.

It is also advantageous that, when the brakes are released, the reduction of the braking force in the trailer brakes is assisted by a corresponding pulse to compensate for the dead times.

Additional advantages can be derived from the following description of exemplary embodiments.

BRIEF DESCRIPTION OF THE DRAWINGS

FIG. 3 shows a realization of the solution according to the invention as a flow chart of a program running on a microcomputer in the electronic control unit of the tractor brake system.

DESCRIPTION OF THE EXEMPLARY EMBODIMENTS

Figure 1:
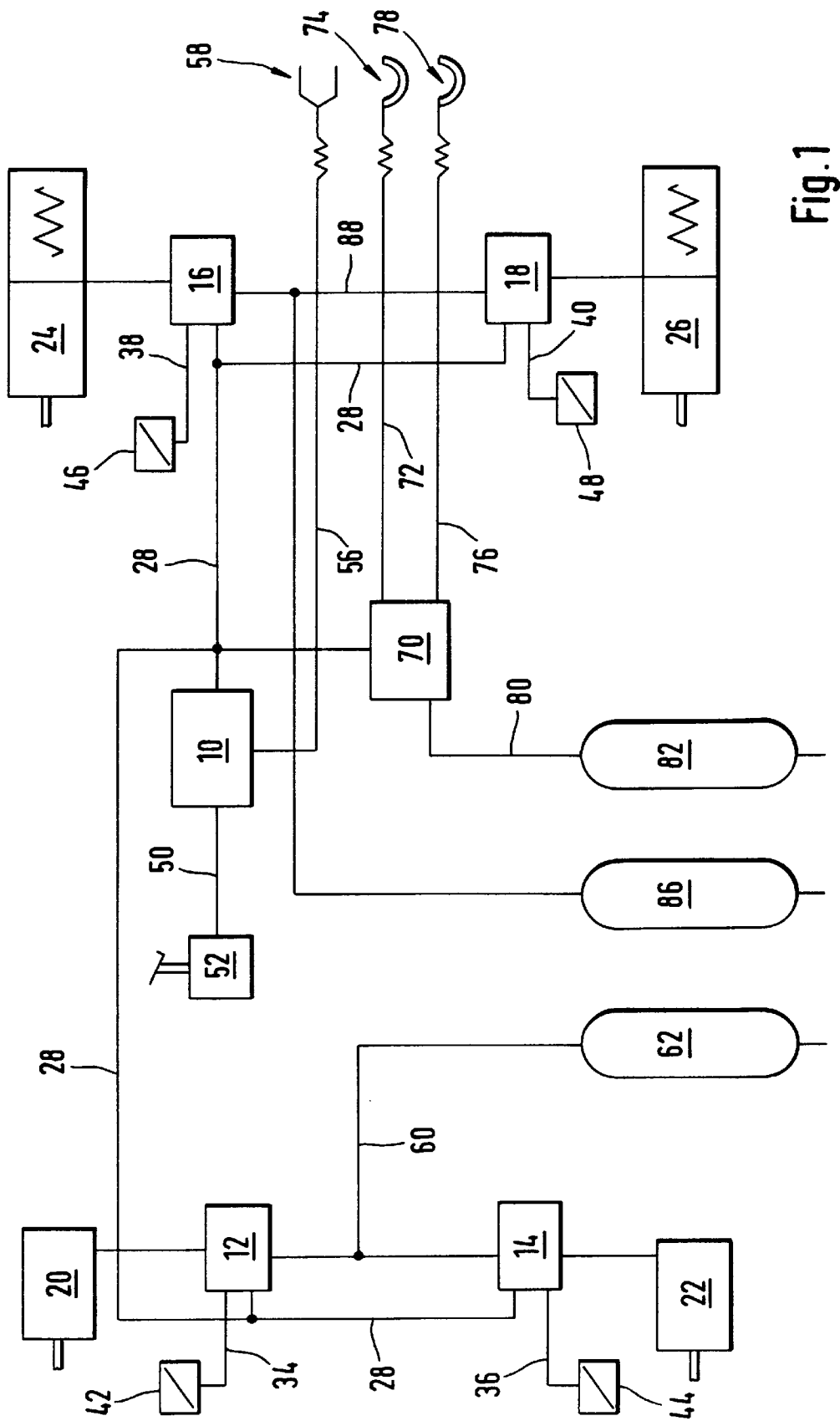
FIG. 1 shows a circuit diagram of an automatic, electrically controlled, pneumatic brake system of a tractor.

FIG. 1 shows an overall block circuit diagram of an automatic, electronically controlled brake system based on the example of an electronically controlled compressed-air brake system for a two-axle tractor with a trailer coupling.

FIG. 1 shows a central control unit 10, which has at least one micro computer. In addition, so-called "decentralized" automatic pressure control modules 12, 14, 16, 18 are provided, each of which is assigned to a wheel brake 20, 22, 24, 26 of the tractor. Central control unit 10 is connected by way of a communications system 28, e.g., a CAN, to automatic pressure control modules 12–18. To detect the braking pressures which are produced and to detect additional values such as axle loads, rotational speeds of the wheels, brake temperatures, etc., lines 34, 36, 38, 40 lead from appropriate measuring devices 42, 44, 46, 48 to automatic pressure control modules 12–18. Central control unit 10 is also connected to a brake value sensor 52 by a line 50. So that a trailer brake system can be controlled, furthermore, a trailer control module 70 is provided, which is connected to central control unit 10 by way of communications system 28. In the area of trailer control module 70, at least one pressure sensor is provided, which detects the pressure in the pneumatic control line leading to the trailer (not shown in FIG. 1). A line 56, furthermore, leads from central control unit 10 to an electric plug connection 58 leading to the trailer.

The pneumatic part of the brake system, which is possibly equipped with an emergency brake circuit (not shown in FIG. 1) for pneumatic actuation of the wheel brakes, consists in the preferred exemplary embodiment of three supply tanks 62, 82, 86. Automatic pressure control modules 12, 14 assigned to wheel brakes 20, 22 of the front axle are connected by line 60 to the supply pressure originating from supply tank 62. Trailer control module 70 is connected by a line 80 to supply pressure tank 82. From trailer control module 70, a pneumatic control line 72 leads to a first coupling head 74, whereas a supply line 76 leads to a second coupling head 78. Automatic pressure control modules 16, 18, which are assigned to wheel brakes 24, 26 of the rear axle of the tractor, are supplied with supply pressure through a line 88, coming from supply tank 86.

In a preferred exemplary embodiment, a measure for the degree to which the brake pedal is actuated is sent to central control unit 10 by brake value sensor 52. This signal is processed in the central control unit, and from the results of this processing, the nominal pressure, the nominal braking torque, the nominal force, or the nominal slip values for the individual wheel brakes or for the trailer are determined in accordance with predetermined characteristic curves or characteristic diagrams, possibly under consideration of additional operating variables such as axle loads, the deceleration of the vehicle, etc. These nominal values are sent over communications system 28 to the individual automatic pressure control modules and to the trailer control module, which produce the pressure in the individual wheel brakes or in the control line leading to the brake system of the trailer in correspondence with the specified nominal value.

Figure 2:
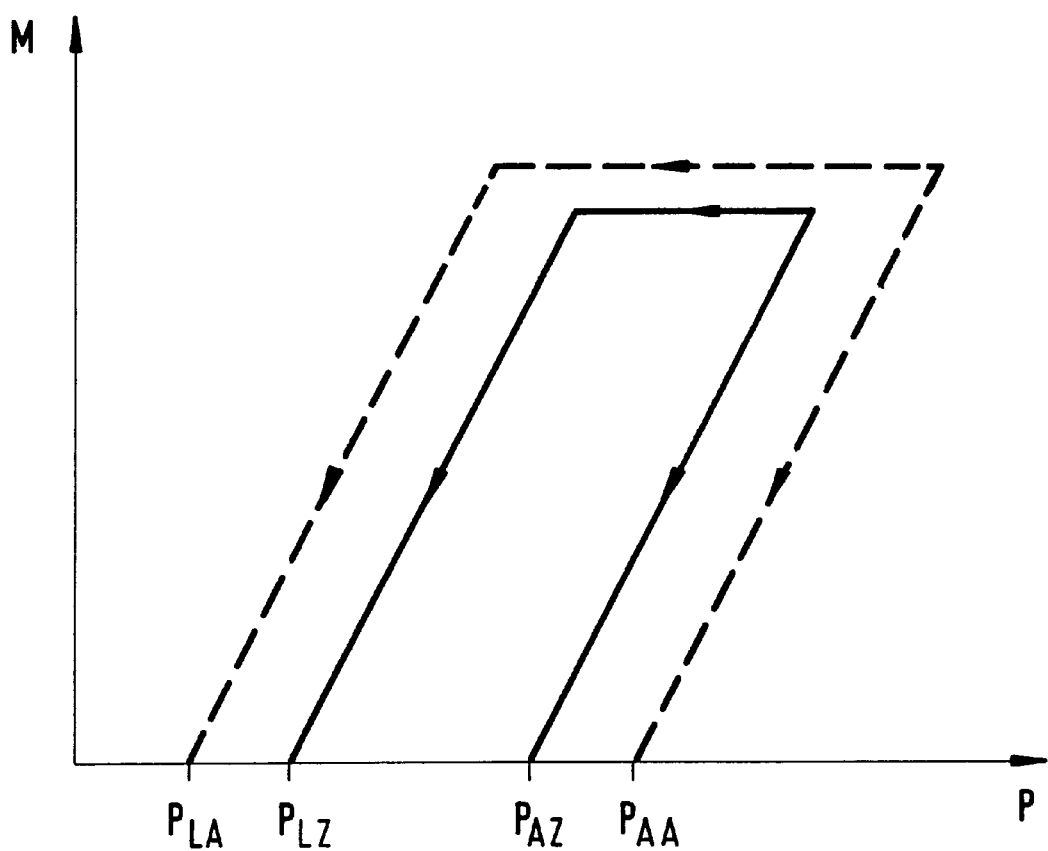
FIG. 2 shows the brake hystereses of a tractor and of a trailer which can be hitched to it.

The individual wheel brakes, specifically the wheel brakes of the tractor and those of the trailer, usually engage at different times and then usually release at different times as well. This means that, during a braking process, the braking action begins at different times at the individual component vehicles. A similar behavior is to be observed upon conclusion of the braking operation, when the brakes are released. The two component vehicles also show different brake hystereses. A typical example is shown in FIG. 2, where the brake hysteresis of a tractor is shown in solid line, the brake hysteresis of a trailer or semitrailer dotted line on a braking torque/braking pressure diagram. $P_{AA}$ and $P_{AZ}$ represent the application pressures of the trailer or semitrailer and of the tractor, respectively, whereas $P_{LZ}$ and $P_{AZ}$ represent the corresponding release pressures of the tractor and trailer or semitrailer, respectively.

It is possible to use, for example, the procedures known from the state of the art to determine the application and release pressures. The application and release pressures of the tractor can be determined on the basis of the curve of the braking pressure, whereas the application and release pressures of the trailer can be determined within the scope of an identification procedure involving the entire vehicle. In the latter case, inflection points, which are attributable to the application and release of the trailer brakes are derived from the change over time in the deceleration of the vehicle. The application and release pressures of the trailer or semitrailer are determined by finding the actual braking pressures prevailing at the inflection points in the deceleration curve.

On the basis of the known application and/or release pressures of the two component vehicles, the control of the trailer brake system is modified in such a way that the brakes engage or release at the same time in both the tractor and in the trailer. As a result, the desired distribution of the braking force between the component vehicles, i.e., the distribution which minimizes the longitudinal forces, is achieved, at least in the static region. Nevertheless, it can happen during the buildup or reduction of the braking pressure, that, as a result of the dead times which are caused by the length of the brake lines leading to the trailer brakes, transient defects occur in the coordination of the component vehicles.

These defects in coordination between the component vehicles are corrected in accordance with the solution of the invention in that, immediately after the actuation of the brake pedal, an elevated pressure pulse is produced at the coupling head leading to the trailer, which pulse brings about a rapid pressure buildup in the trailer brake lines. Use is made of the empty distance of the brake pedal. Whereas the nominal pressure for the tractor brakes is not produced until after the brake pedal has traveled a certain minimum distance, the elevated pressure pulse for the trailer brakes is produced immediately, i.e., as soon as the beginning of a braking operation is recognized on the basis of the position of the brake pedal. The degree to which the pressure is built up corresponds to the determined application pressure of the trailer and/or to the difference between the determined application pressures of the tractor and that of the trailer. When, during the course of a braking operation, the brake pedal is then pushed down even farther by the driver, here again, to support the buildup of the braking pressure, a so-called "lead" pulse is transmitted, independently of the automatic control of the pressure in the trailer brake line. When it is recognized that the brakes are being released, then, if it is the first time that the brake is released after the completion of a pressure buildup, a pressure reduction pulse independent of the automatic control is transmitted, this pulse leading to a reduction of the pressure in the control line leading to the trailer brakes. The value of this pressure reduction pulse is just large enough to compensate for the hysteresis of the trailer brakes or just large enough to adjust the hysteresis to match the known hysteresis value of the tractor brakes. This means that the amount by which pressure is reduced is equal to the difference between the application and release pressure of the trailer or to the difference between this difference and the corresponding one of the tractor. As a result, the dead times which can occur as a result of the very large hysteresis of the trailer are compensated. In addition, to support the speed at which the pressure is reduced in the trailer, a corresponding lead pulse similar to that used for the pressure buildup is transmitted each time the brake pedal is released.

An example of a realization of the solution according to the invention in the form of a program running on a microcomputer in control unit 10 is illustrated in the flow chart of FIG. 3.

The program illustrated in FIG. 3 is started when the pedal is actuated by the driver. In first step 100, the detected and stored value for the application pressure of the trailer or semitrailer $P_{AA}$ and possibly that of the tractor $P_{AZ}$ are read in as input. In the next step 102, the first pressure pulse for the trailer is determined on the basis of the stored application pressure $P_{AA}$ and/or the difference between $P_{AA}$ and $P_{AZ}$ and produced by appropriate drive signals sent to the trailer control module. The duration of the pressure pulse, that is, the opening time of a pressure inlet valve for the trailer control line, is just long enough to cause the trailer brakes to engage. The braking pressure thus produced corresponds essentially to the application pressure. In another exemplary embodiment, the difference between the application pressures of the tractor and of the trailer are produced, or the application pressure which has already been produced is reduced in this way. After the pressure pulse determined in this way has been transmitted, the degree of actuation β of the pedal and possibly additional operating variables such as axle loads are accepted as input in the next step 104. In step 106, the nominal values for the individual wheel brakes or trailer brake system are then determined according to the predetermined characteristic curves or characteristic diagrams as a function of the degree of actuation β and possibly of additional operating variables and transmitted to the automatic pressure control modules or to the trailer control module. Within the scope of automatic pressure control circuits, these modules produce the nominal values determined and transmitted in step 106. In test step 108, the program checks to see whether the driver has released the brake pedal. If he has not, the program checks to see in step 110 whether he has actuated the brake pedal again. If the driver actuates the brake pedal beyond a certain value, then in step 112 a pressure buildup pulse is formed and transmitted, which compensates for the dead time present as a result of the length of the trailer brake lines. This additional pressure pulse (pressure "lead") and the corresponding reduction pulse upon release of the brake, described further below, can also be implemented in an advantageous exemplary embodiment as a differential component of the automatic pressure controller of the trailer control module.

After step 112, or, in the case that, in step 110, it was found that the brake pedal has not been actuated beyond a certain value, the program checks to see in step 114 whether or not the brake pedal has been completely released. If this is not the case, the subprogram goes back to step 104 upon expiration of a predetermined time T; otherwise, it terminates until the next time the pedal is actuated.

If it was found in step 108 that the driver has released the brake pedal, the program checks in step 116 on the basis of flags which have been set whether or not this release of the brake pedal is the first release after a pressure buildup. If it is the first, the application and release pressures of the trailer and the tractor ($P_{LA}$, $P_{AA}$, $P_{LZ}$, and $P_{AZ}$) are read in as input in step 118; and in the next step 120, a pressure reduction pulse is calculated on the basis of these application and release pressures. This pressure reduction pulse serves to support the automatic pressure control of the trailer brake system in such a way that the different hystereses of the tractor and of the trailer are compensated as completely as possible. In one design, therefore, the duration of the pressure pulse is calculated on the basis of the difference between the application and release pressure of the trailer brake system, the pulse releasing just enough pressure in the trailer brake system to compensate for the hysteresis of the trailer brakes, while leaving the braking torque essentially unchanged. In another design, the duration of the pulse is determined so that the amount of pressure which is released in the trailer brake system is sufficient to reduce brake hysteresis of the trailer to the hysteresis value of the tractor. This means that the pulse duration is determined on the basis of the difference between the application and release pressures of the trailer and the difference between the application and release pressure of the tractor. After step 120, the program checks in step 114 to see whether the brake pedal has been completely released or not and initiates the corresponding measures. If the release of the brake pedal found in step 108 is not the first one to occur after the pressure buildup but rather another release as the driver continues to ease off on the brake pedal, a pressure reduction pulse of a certain duration, supporting the automatic control, is formed and transmitted in step 122, similar to step 112, in order to take into account the dead time of the trailer brake systems. After step 122, the program continues to step 114.

The procedure described on the basis of the flow chart of FIG. 3 thus consists in that, at the beginning of a braking operation, a pressure derived from the application pressure and/or the difference $P_{AA}-P_{AZ}$ is first sent to the brake system of the trailer. When the position of the brake pedal is changed again with goal of increasing the pressure, a pressure "lead" pulse of predetermined duration, which can also be dependent on the current pressure level, is formed to reduce the dead time of the trailer brake systems. The same sort of process occurs when the brake is released. When the driver releases the brake pedal for the first time after a pressure buildup, a pressure pulse is transmitted to the trailer brake systems which compensates for the trailer brake hysteresis or releases enough pressure so that the remaining trailer brake hysteresis corresponds to that of the tractor. The duration of the pressure pulse therefore depends on the application and release pressures of the trailer and possibly on those of the tractor. If the driver releases the brake pedal even farther, then, here, too, in analogy to the pressure buildup, a pressure "lead" pulse is determined, which reduces the dead time of the trailer brake systems and thus considerably improves the automatic pressure control of the trailer brake systems.

Figure 4A:
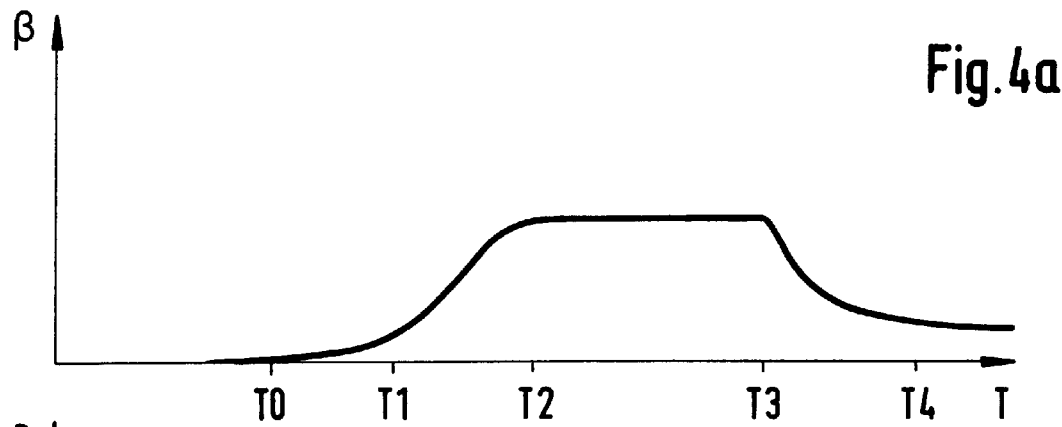
FIG. 4 consists of time diagrams, which show the change over time of the brake pedal actuation signal, of the braking pressure at the coupling head between the tractor and the trailer, and of the braking torque of the trailer brakes.
Figure 4B:
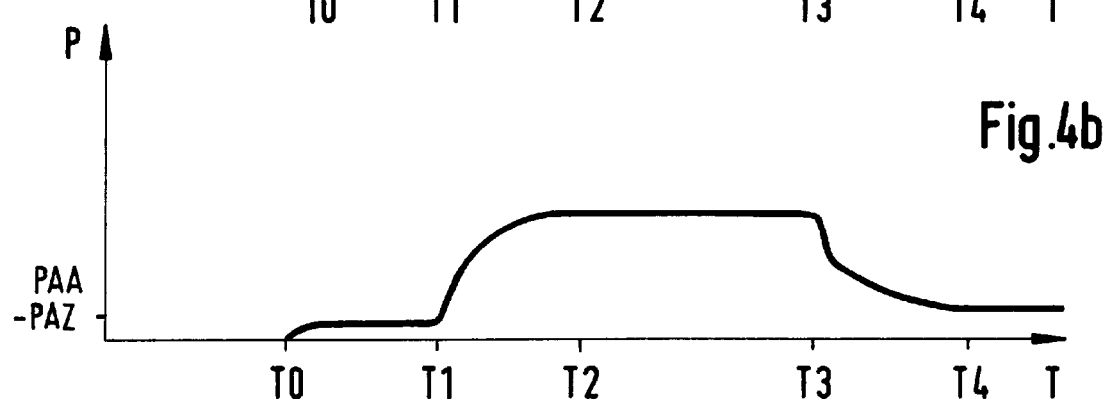
Figure 4C:
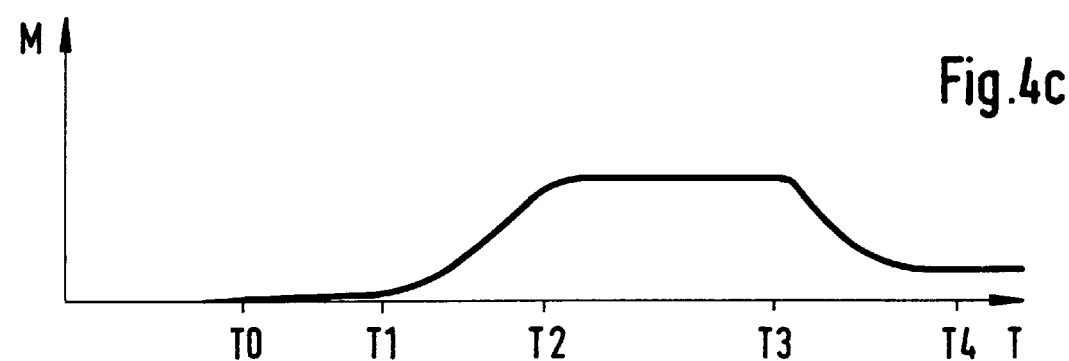

FIG. 4a shows the change over time in the degree of actuation of the brake pedal. FIG. 4b shows the change over time in the control pressure sent to the trailer. FIG. 4c shows the braking torque of the trailer brake systems.

At time $T_0$, the driver steps on the brake pedal (see FIG. 4a). This leads, according to FIG. 4b, to the production of the application pressure $P_{AA}$ and/or the difference $P_{AA}-P_{AZ}$ in the trailer brake system. The braking torque generated by the trailer brake system remains zero. At time $T_1$, the pedal actuation exceeds the limit value defined for the calculation of the nominal values for the tractor. Up to this point, the application pressure remains in effect in the trailer brake system, and the generated braking torque remains zero. As a result of the procedure described above, starting at time $T_1$ the control pressure for the trailer increases very quickly in correspondence with the course of the degree of actuation, so that the braking torque shows a course corresponding to the degree of actuation β, as seen in FIG. 4c. At time $T_2$, the pressure buildup is completed, so that control pressure and braking torque remain unchanged in correspondence with the degree of actuation. At time $T_3$, the driver releases the brake pedal for the first time after the pressure buildup. According to the invention, this leads to an abrupt reduction in the control pressure for the trailer at time $T_3$ without a corresponding reduction of the braking torque. Starting at time $T_3$, then, the control pressure, possibly under formation of lead pulses, is reduced in correspondence with the degree of actuation until point $T_4$ is reached. The braking torque, starting from time $T_3$, shows a reduction corresponding the degree of actuation; after the first time the brake pedal is released after the pressure buildup, nonuniform changes in the braking torque of the tractor and of the trailer are essentially compensated by pressure pulses of this type.

The measures described concerning the pulses transmitted upon the first actuation of the brake pedal and upon the first release of the brake pedal and concerning the lead pulses transmitted during the pressure buildup and reduction phases can be used individually or in any desired combination as appropriate to the exemplary embodiment in question.

What is claimed is:

1. Method for controlling the brakes of a vehicle having at least a first and a second component vehicle, including a brake pedal and a brake system, said method comprising:

determining and storing an application pressure value of a brake system of the first vehicle;

determining and storing an application pressure value of a brake system of the second vehicle;

determining the difference between the application pressure value of the first vehicle and the value of the second vehicle;

forming an actuating pulse for the second component vehicle, the length of which is determined according to said difference; and sending said formed actuating pulse for actuating the brake system of the second vehicle to the second vehicle responsive to a first actuation of the brake pedal.

2. Method according to claim 1, wherein, as the brake pedal continues to be actuated, a lead pulse of the actuation signal is formed for the brake system of the second component vehicle to compensate for a period of dead time during buildup of braking force in the second component vehicle.

3. Method according to claim 1, wherein the actuation signal is a control pressure.

4. Method according to claim 1, wherein the duration of the actuation pulse corresponds to the application pressure or to the difference between the application pressures of the first and second component vehicles, and, after the application pressure has been produced, the actuation signal being reduced in correspondence with said difference.

5. Apparatus for controlling the brakes of a vehicle with a brake pedal and including at least a first and a second component vehicle each having a brake system, said apparatus comprising:

a unit for determining and storing an application pressure value of a brake system of the first vehicle and for determining and storing an application pressure value of a brake system of the second vehicle;

a unit for determining the difference between the application pressure value of the first and the value of the second vehicle, a unit for forming an actuating pulse for the second component vehicle, the length of which is determined according to said difference; and an electronic control unit for sending said formed actuating pulse for actuating the brake system of the second vehicle to the second vehicle responsive to a first actuation of the brake pedal.

6. Method for controlling the brakes of a vehicle having at least a first and a second component vehicle, including a brake pedal and a brake system, wherein the brakes of the vehicles are controlled on the basis of actuation signals derived from the actuation of the brake pedal, said method comprising:

producing an elevated pressure pulse for the second component vehicle immediately after the actuation of the brake pedal, whereas the generated braking torque remains zero;

determining the brake pedal travel distance;

comparing the brake pedal travel with a certain minimum distance;

producing a nominal pressure for the brakes of the first component vehicle, when the brake pedal travel exceeds the minimum distance, whereas nominal pressure values are not produced when the brake pedal travel lowers the minimum distance;

increasing the pressure of the brakes of the second component vehicle in correspondence with the degree of actuation of the brake pedal, when the brake pedal travel exceeds said minimum distance.

7. Method for controlling the brake system of a vehicle having at least two component vehicles including a brake pedal, each having a brake system, said method comprising:

sending from the first component vehicle to the second component vehicle an actuation signal for actuating the brake system;

detecting the first release of the brake pedal after a buildup of the braking force in the second component vehicle;

forming a braking force reduction pulse of the actuation signal in the first component vehicle, having a length depending on the width of the hysteresis in the actuation signal of the second component vehicle between buildup and release of the braking force; and sending said pulse from the first component vehicle to the second component vehicle for actuating the brake system of the second component vehicle.

8. An apparatus for controlling the brakes of a vehicle having at least a first and a second component vehicle, including a brake pedal and a brake system, wherein the brakes of the vehicles are controlled on the basis of actuation signals derived from the actuation of the brake pedal, said apparatus comprising:

a unit for producing an elevated pressure pulse for the second component vehicle immediately after the actuation of the brake pedal, whereas the generated braking torque remains zero;

a unit for determining the brake pedal travel distance;

a unit for comparing the brake pedal travel with a certain minimum distance;

a unit for producing a nominal pressure for the brakes of the first component vehicle, when the brake pedal travel exceeds the minimum distance, whereas no nominal pressure value is produced when the brake pedal travel lowers the minimum distance;

a unit for increasing the pressure for the brakes of the second component vehicle in correspondence with the degree of actuation of the brake pedal, when the brake pedal travel exceeds said the minimum distance.

9. An apparatus for controlling the brake system of a vehicle having at least two component vehicles including a brake pedal, each having a brake system, said apparatus comprising:

a unit for sending from the first component vehicle to the second component vehicle an actuation signal for actuating the brake system;

a unit for detecting the first release of the brake pedal after a buildup of the braking force in the second component vehicle;

a unit for forming a braking force reduction pulse of the actuation signal in the first component vehicle, having a length depending on the width of the hysteresis in the actuation signal of the second component vehicle between buildup and release of the braking force; and a unit for sending said pulse from the first component vehicle to the second component vehicle for actuating the brake system of the second component vehicle.

* * * * *